US012057277B2

(12) United States Patent
Lee et al.

(10) Patent No.: US 12,057,277 B2
(45) Date of Patent: Aug. 6, 2024

(54) OPERATING ASSEMBLY AND HOUSEHOLD APPLIANCE

(71) Applicant: FOSHAN SHUNDE MIDEA WASHING APPLIANCES MANUFACTURING CO., LTD., Foshan (CN)

(72) Inventors: Jongmoon Lee, Foshan (CN); Yong Li, Foshan (CN); Chunkyu Woo, Foshan (CN); Gang Cheng, Foshan (CN)

(73) Assignee: FOSHAN SHUNDE MIDEA WASHING APPLIANCES MANUFACTURING CO., LTD., Foshan (CN)

( * ) Notice: Subject to any disclaimer, the term of this patent is extended or adjusted under 35 U.S.C. 154(b) by 253 days.

(21) Appl. No.: 17/737,960

(22) Filed: May 5, 2022

(65) Prior Publication Data

US 2022/0262583 A1 Aug. 18, 2022

Related U.S. Application Data

(63) Continuation of application No. PCT/CN2020/123676, filed on Oct. 26, 2020.

(30) Foreign Application Priority Data

Jan. 9, 2020 (CN) ......................... 202010022867.2

(51) Int. Cl.
*H01H 25/06* (2006.01)

(52) U.S. Cl.
CPC ................................ *H01H 25/065* (2013.01)

(58) Field of Classification Search
CPC ........... H01H 25/065; H01H 2003/085; H01H 25/06; H01H 25/006; H01H 25/008
See application file for complete search history.

(56) References Cited

U.S. PATENT DOCUMENTS 5,665,946 A * 9/1997 Nishijima .............. H01H 25/06 200/18
7,113,836 B2 * 9/2006 Hornig ................... H01H 25/06 345/161

(Continued)

FOREIGN PATENT DOCUMENTS

CN 201199055 Y 2/2009
CN 101490635 A 7/2009

(Continued)

OTHER PUBLICATIONS

International Search Report of PCT Application No. PCT/CN2020/123676 mailed Jan. 27, 2021.

(Continued)

*Primary Examiner* — Lheiren Mae A Caroc

(57) ABSTRACT

Provided are an operating assembly and a household appliance. The operating assembly includes a first operating portion and a second operating portion. The first operating portion is at least partially disposed in the second operating portion. The second operating portion can be located at and move back and forth between a first position and a second position of the first operating portion. When the second operating portion is located at the first position, the second operating portion can rotate relative to the first operating portion to generate a first electric signal; when the second operating portion is located at the second position, the second operating portion can drive the first operating portion to rotate to generate a second electrical signal during the rotation of the first operating portion; and the first operating portion can be pressed to generate a third electric signal.

20 Claims, 5 Drawing Sheets

(56) References Cited

U.S. PATENT DOCUMENTS

| | | | | |
|---|---|---|---|---|
| 2008/0023313 | A1 | 1/2008 | Sack et al. | |
| 2010/0032266 | A1 | 2/2010 | Stephan | |
| 2019/0198276 | A1 | 6/2019 | Abdala | |
| 2023/0154701 | A1 * | 5/2023 | Hong | H01H 25/065 200/336 |

FOREIGN PATENT DOCUMENTS

| | | | |
|---|---|---|---|
| CN | 202758794 | U | 2/2013 |
| CN | 103000435 | A | 3/2013 |
| CN | 103903900 | A | 7/2014 |
| CN | 105655187 | A | 6/2016 |
| CN | 208608099 | U | 3/2019 |
| CN | 208836108 | U | 5/2019 |
| CN | 209084831 | U | 7/2019 |
| CN | 110131755 | A | 8/2019 |
| CN | 110626294 | A | 12/2019 |
| CN | 111192781 | A | 5/2020 |
| DE | 102005045300 | A1 | 9/2006 |
| KR | 101986124 | B1 | 6/2019 |

OTHER PUBLICATIONS

The first OA and search report mailed Mar. 3, 2021 for CN Application No. 202010022867.2.

The Grant Notice mailed Apr. 16, 2021 for CN Application No. 202010022867.2.

Extended European Search Report issued Dec. 20, 2022 regarding EP Application No. 20912368.6.

* cited by examiner

OPERATING ASSEMBLY AND HOUSEHOLD APPLIANCE

CROSS-REFERENCES TO RELATED APPLICATIONS

The present disclosure is a continuation of International Application No. PCT/CN2020/123676, filed on Oct. 26, 2020, which claims priority to Patent Application 202010022867.2, filed on Jan. 9, 2020 with China National Intellectual Property Administration, the entireties of which are herein incorporated by reference.

FIELD

The present disclosure relates to the field of household appliance, and more particularly, to an operating assembly and household appliance.

BACKGROUND

In the related technology, household appliances, such as microwave ovens, electric ovens, gas stoves, etc., are provided with rotary knob for users to operate. The rotary knob is used to adjust the functions, time or power of the household appliance.

SUMMARY

The embodiments of the present disclosure provide an operating assembly and household appliance.

Some embodiments of the present disclosure provides an operating assembly for a household appliance. The operating assembly includes a first operating portion and a second operating portion. The first operating portion is at least partially disposed in the second operating portion. The second operating portion may be located at a first position and a second position of the first operating portion, and may move back and forth between the first position and the second position. The operating assembly being configured in such a manner that: when the second operating portion is located at the first position, the second operating portion is rotatable relative to the first operating portion to generate a first electric signal; when the second operating portion is located at the second position, the second operating portion may drive the first operating portion to rotate, and a second electric signal is generated during the rotation of the first operating portion; and the first operating portion may be pressed to generate a third electric signal.

Some embodiments of the present disclosure provides a household appliance. The household appliance includes the operating assembly as described in any of the above-mentioned embodiments, and a panel. The operating assembly is mounted on the panel.

In the following description, part of the embodiments of the present disclosure will be provided, and part of them will become apparent in view of the following description or may be learned by practice of the present disclosure.

BRIEF DESCRIPTION OF THE DRAWINGS

The above and/or additional embodiments of the present disclosure will become apparent and readily understood from the description of embodiments taken in conjunction with the following accompanying figures.

Figure 1:
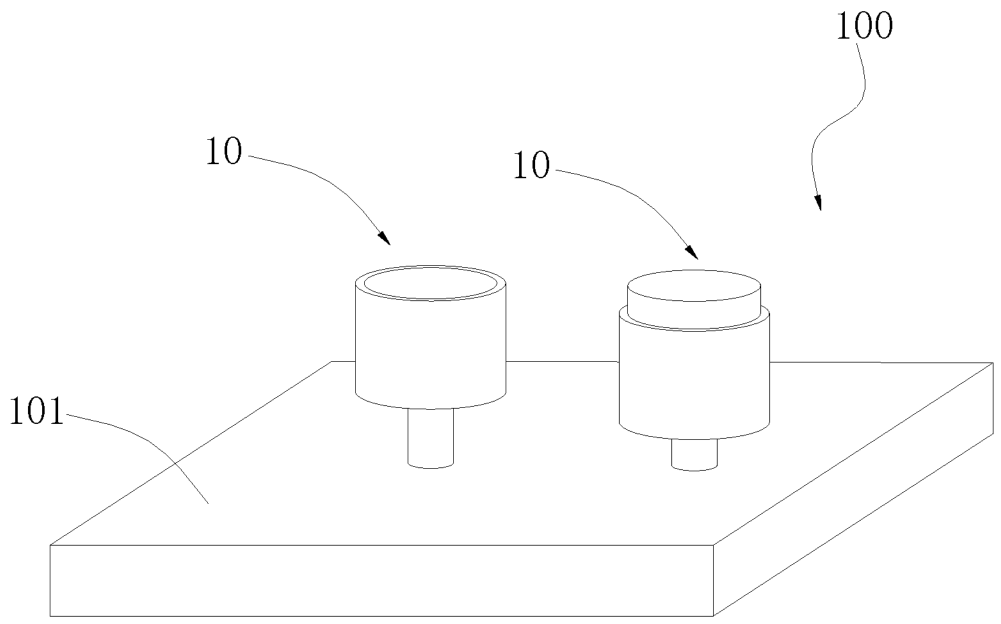
FIG. 1 is a partial structural schematic diagram of a household appliance according to an embodiment of the present disclosure.

REFERENCE NUMBERS OF RELEVANT COMPONENTS household appliance 100, panel 101, opening 102, operating assembly 10, first operating portion 11, upper portion 113, middle portion 114, lower portion 115, fixture portion 116, second operating portion 12, third portion 121, protruding portion 13, recess 14, coupling structure 15, fixture block 151, fixture seat 152, first elastic member 16, first contact member 17, second contact member 18, base 19, output terminal 191, receiving space 192, limiting structure 20, limiting recess 201, second elastic member 21, switch member 22, body 221, elastic contact member 222, encoder 23, first portion 30, first notch 40, second notch 50, third notch 60.

DETAILED DESCRIPTION OF THE DISCLOSURE

Embodiments of the present disclosure are described below in detail, examples of the embodiments are shown in accompanying drawings, and throughout the description, the same or similar reference signs represent the same or similar components or the components having the same or similar functions. The embodiments described below with reference to the accompanying drawings are exemplary and merely used to explain the present disclosure, rather than being construed as limitation on the present disclosure.

In the description of the present disclosure, it should be understood that the orientation or position relationship indicated by the terms "center", "longitudinal", "transverse", "length", "width", "thickness", "upper", "lower", "front", "rear", "left", "right", "vertical", "horizontal", "top", "bottom", "inner", "outer", "clockwise", "counterclockwise", etc., is based on the orientation or position relationship shown in the drawings, and is only for the convenience of describing the present disclosure and simplifying the description, rather than indicating or implying that the defined device or element must have a specific orientation or must be constructed and operated in a specific orientation. Thus, the orientation or position relationship indicated by these terms cannot be understood as limitations of the present disclosure. In addition, the terms "first" and "second" are only used for purpose of description, and cannot be understood as indicating or implying relative importance or implicitly indicating the number of indicated embodiments. Therefore, the features defined with "first" and "second" may explicitly or implicitly include at least one of the features. In the description of the present disclosure, “plurality” means at least two, unless otherwise specifically defined.

In the description of the present disclosure, it should be noted that, unless otherwise clearly specified and limited, terms such as “install”, “mount”, “connect to” and the like should be understood in a broad sense. For example, it may be a fixed connection or a detachable connection or connection as one piece; mechanical connection or electrical connection; direct connection or indirect connection through an intermediate; internal communication of two components or the interaction relationship between two components, unless otherwise clearly limited. The specific meaning of the above-mentioned terms in the present disclosure can be understood according to specific circumstances.

In the present disclosure, unless expressly stipulated and defined otherwise, the first feature “on” or “under” the second feature may include the scenarios that the first feature is in direct contact with the second feature, or the first and second features, instead of being in direct contact with each other, are in contact with each other through another feature therebetween. In one embodiment, the first feature “above” the second feature may indicate that the first feature is directly above or obliquely above the second feature, or simply indicate that the level of the first feature is higher than that of the second feature. The first feature “below” the second feature may mean that the first feature is directly below or obliquely below the second feature, or simply mean that the level of the first feature is smaller than that of the second feature.

The following description provides many different embodiments or examples for implementing different structures of the disclosure, and in order to simplify the disclosure of the disclosure, the members and dispose of specific examples are described below. They are only examples and are not intended to limit the disclosure. Furthermore, the present disclosure may repeat reference numerals and/or reference letters in different examples, such repetition is for the purpose of simplicity and clarity and does not in itself indicate a relationship between the various embodiments and/or dispose discussed. In addition, the present disclosure provides examples of various specific processes and materials, but the application of other processes and/or the use of other materials.

Figure 2:
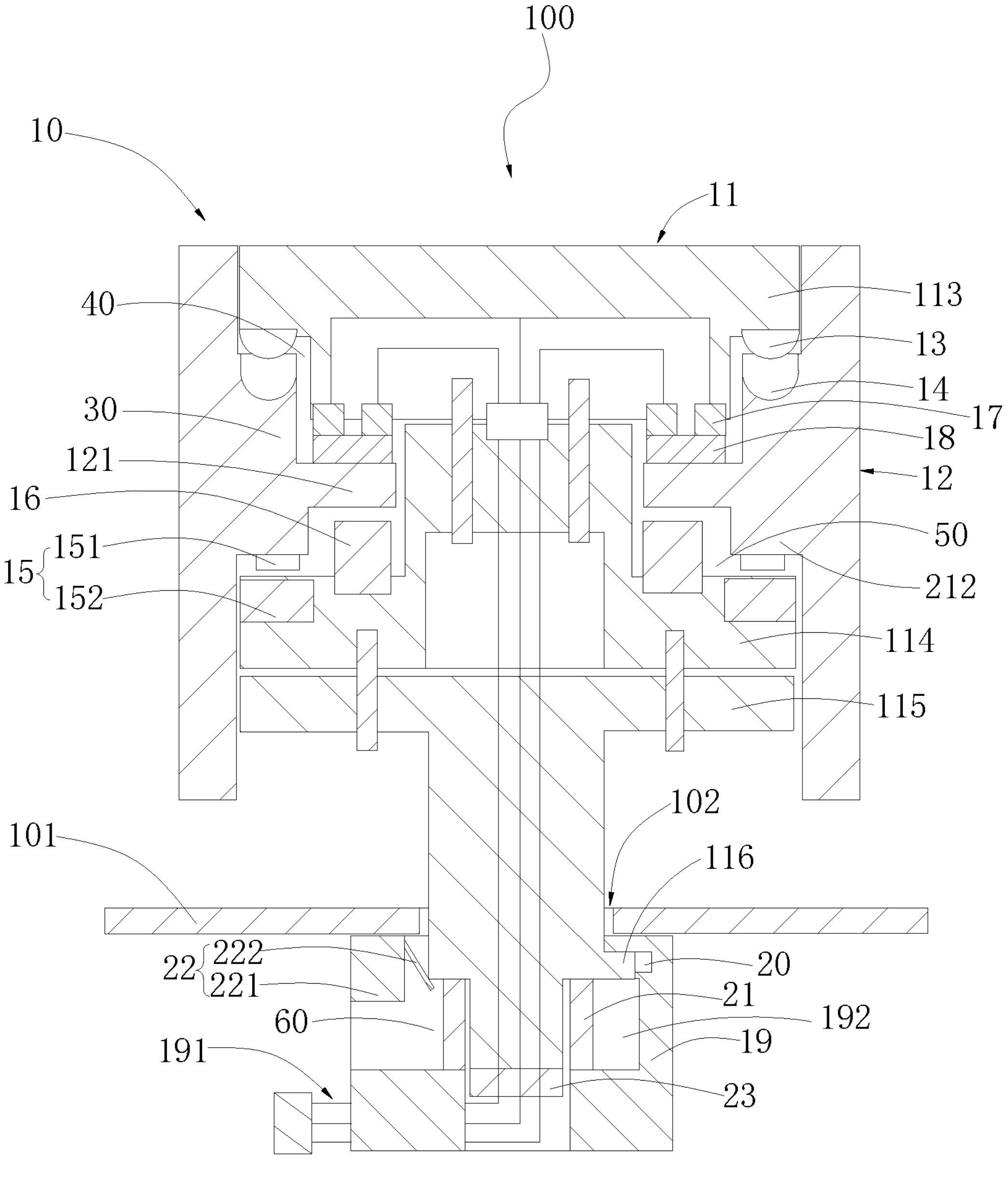
FIG. 2 is a schematic cross-sectional view of an operating assembly according to an embodiment of the present disclosure.
Figure 3:
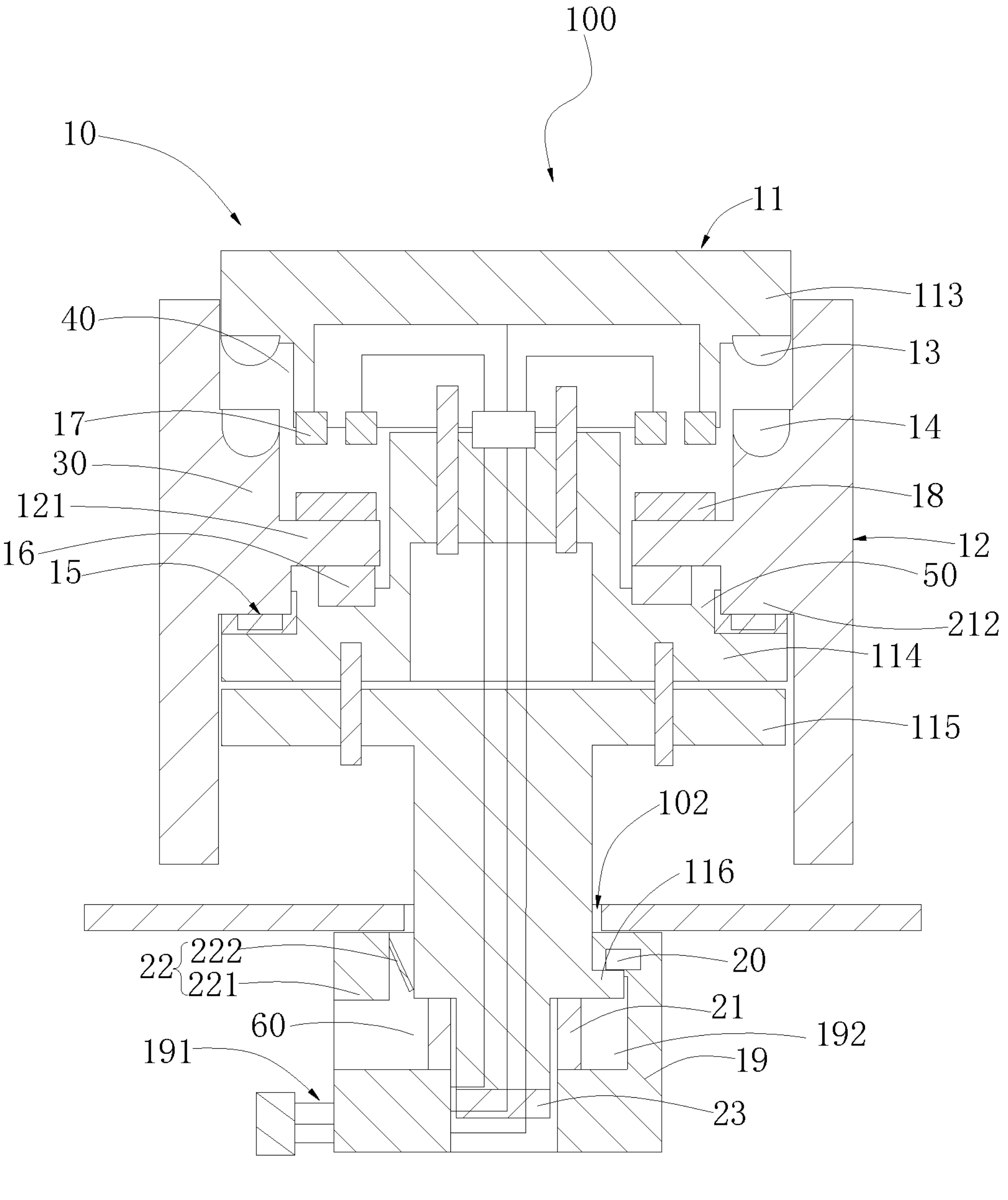
FIG. 3 is another schematic cross-sectional view of an operating assembly according to an embodiment of the present disclosure.

Referring FIG. 1 to FIG. 3, an embodiment of the present disclosure provides an operating assembly 10 for a household appliance 100. The operating assembly 10 includes a first operating portion 11 and a second operating portion 12. The first operating portion 11 is at least partially disposed in the second operating portion 12, and the second operating portion 12 can be located at a first position (FIG. 2) and a second position (FIG. 3) of the first operating portion 11, and can move back and forth between the first position and the second position. The operating assembly 10 is configured in such a manner that, when the second operating portion 12 is located at the first position, the second operating portion 12 is rotatable relative to the first operating portion 11 to generate a first electric signal; and when the second operating portion 12 is located at the second position, the second operating portion 12 can drive the first operating portion 11 to rotate, and a second electric signal is generated during the rotation of the first operating portion 11.

The first operating portion 11 can be pressed to generate a third electric signal.

In the operating assembly 10 of the embodiment of the present disclosure, when different operations are performed on the first operating portion 11 and the second operating portion 12, the operating assembly 10 can output electric signals, and the functions of the operating assembly 10 can be multiplied by providing the two operating portions. In this way, the multi-functional requirements of a household appliance 100 can be satisfied, and the structure is simple and easy to be implemented to improve the user convenience.

In some embodiments, the household appliance 100 includes, but are not limited to, gas stoves, induction cookers, microwave ovens, ovens, washing machines, dishwashers, hoods and other electrical appliances. The operating assembly 10 is configured to control the operations of the household appliance 100. For example, in a case that the household appliance 100 is a gas stove, the operating assembly 10 can be configured to ignite, adjust the fire of the gas stove, and adjust operating parameters of the gas stove, such as configuration value adjustment, cooking program selection, interface movement, etc. For another example, in the case where the household appliance 100 is an induction cooker, the operating assembly 10 can be configured to adjust a power of the induction cooker and select a working mode of the induction cooker. For yet another example, in the case where the household appliance 100 is a washing machine, the operating assembly 10 may be configured to adjust working time and working mode of the washing machine. That is, when the household appliance 100 has different functions, it can be controlled by the operating assembly 10, which has a simple structure and is easy to be implemented to improve the user convenience.

Further, the different electric signals correspond to different functions of the household appliance 100, and they can be specifically designed according to the actual functions of the household appliance 100. As an example, the household appliance 100 is a gas stove, and a panel of the gas stove has a display screen disposed thereon for displaying a user interface, with reference to Table 1:

| User Operation | Knob State | Function Definition |
|---|---|---|
| 1.1 Clockwise rotating without pressing | 1.2 Second operating portion: clockwise rotated | User interface moves to the right<br>User interface moves down<br>User interface configuration value increases |
| 2.1 Anticlockwise rotating without pressing | 2.2 Second operating portion: counterclockwise rotated | User interface moves to the left<br>User interface moves up<br>User interface configuration value decreases |
| 3.1 Pressing | 3.2 First operating portion press detection & first operating portion not rotated | User interface execution |
| 4.1 Pressing and Rotating | 4.2 The first operating portion press detection & first operating portion rotated | Fire adjustment<br>(Stove not ignited - ignited) |

Initially, the second operating portion 12 is located at the first position, the user interface displays a cursor (or focus), and a user can rotate the second operating portion 12 to move the cursor, to select a corresponding cooking program or a cooking mode on the user interface. When the cursor is located at a program or a mode that the user wants to select, the user can press the first operating portion 11 to enter the corresponding program or mode, in which the user can rotate the second operating portion 12 to adjust configuration values (such as the heating time duration, power, reservation time, etc.). After adjusting the configuration values, the user can press the first operating portion 11 to complete the adjustment of the configuration values. Thereafter, the user can press the second operating portion 12 to move the second operating portion 12 from the first position to the second position. At this time, the second operating portion 12 can drive the first operating portion 11 to rotate, the user can continue to press the second operating portion 12 to the maximum extent within a pressing stroke thereof, allowing the first operating portion 11 to be pressed to perform the ignition operation on the gas stove. Then, the user can rotate the second operating portion 12 to drive the first operating portion 11 to rotate to ignite and adjust the fire of the gas stove. It can be seen that the adjustment of the configuration values of the gas stove as well as the ignition and fire adjustment of the gas stove can be implemented by the user through rotating the different operating portions of the operating assembly 10, and the structure is simple and easy to be implemented to improve the user convenience.

The different electric signals of the operating assembly 10 corresponding to the different functions of a gas stove are described below by means of examples.

Referring to the above Table 1, the first electric signal can be used to control the movements of the user interface and changes of the configuration values of the gas stove. When the second operating portion 12 is located at the first position, the second operating portion 12 can be rotated clockwise and counterclockwise, and different first electric signals are output. For example, when the second operating portion 12 is located at the first position, the clockwise rotation of the second operating portion 12 allows the user interface to move to the right or move down, or allows the user interface configuration value to increase (such as increasing the reservation time), increases; and the counterclockwise rotation of the second operating portion 12 allows the user interface to move to the left or move upward, or allows the user interface configuration value decreases (such as increasing the appointment time). The specific can be set according to the actual situation, which is not limited herein.

The second electric signal can be used to control a fire of a gas stove. When the second operating portion 12 is located at the second position, the second operating portion 12 can be rotated to drive the first operating portion 11 to rotate clockwise and counterclockwise, and different second electric signals can be output. For example, when the second operating portion 12 is located at the second position, the clockwise rotation of the first operating portion 11 can intensify the fire of the gas stove, and the counterclockwise rotation of the first operating portion 11 can weaken the fire of the gas stove. In one embodiment, when the second operating portion 12 is located at the second position, the counterclockwise rotation of the first operating portion 11 can intensify the fire of the gas stove, and the clockwise rotation of the first operating portion 11 can weaken the fire of the gas stove. It can be set according to the actual situation and is not limited herein.

The third electric signal can be used to control a user interface execution. For example, after adjusting a configuration value, the first operating portion 11 is pressed to generate the third electric signal. In this case, the setting of the configuration values has been completed, and the gas stove can operate under the control based on the setting of the configuration values.

The description above is merely intended to illustrate the working modes of the operating assembly 10 in the gas stove by means of examples. In other embodiments, the first electric signal, the second electric signal, and the third electric signal may correspond to other functions of the gas stove, and can be specifically set according to different situations, which is not limited herein. It should be noted that, in the cases that the household appliance 100 is an electrical appliance other than the above described one, the functions of the household appliance 100 corresponding to the first electric signal, the second electric signal and the third electric signal generated by the operating component 10 are also different. The specific correspondence therebetween can be designed according to the actual situation, which is not limited herein.

In view of the above, the operating assembly 10 can be adapted to multiple functions of different household appliance 100 by means of the settings of the operating assembly 10, and the structure thereof is simple and easy to be implemented. In one embodiment, the user can conveniently and quickly implement different control effects by simply rotating or pressing the operating assembly 10.

When the second operating portion 12 is located at the second position, the second operating portion 12 can drive the first operating portion 11 to rotate. In this case, the first operating portion 11 can be rotated directly or through the rotation of the second operation 12 by the user. That is to say, the user can choose to rotate the second operating portion 12 to drive the first operating portion 11 to rotate, or can directly rotate the first operating portion 11. The specific rotation can be selected according to different situations, which is not limited herein.

In addition, the second operating portion 12 may has an anti-skid structure provided on an outer peripheral surface thereof and surrounding the surface of the second operating portion 12. By providing the anti-skid structure, a friction coefficient of the surface of the second operating portion 12 can be increased, and thus it is convenient for the user to use the second operating portion 12 and improves user experience. The anti-skid structure may be anti-skid protrusions, rubber layers, etc. The specific type of the anti-skid structure is not limited herein. It is only needed that the anti-skid structure can increase the friction coefficient of the surface of the second operating portion 12.

In an embodiment of the present disclosure, both the first operating portion 11 and the second operating portion 12 are substantially cylindrical. In other embodiments, the first operating portion 11 and the second operating portion 12 may also be in other shapes, which is not limited herein. It is only needed that the first operating portion 11 and the second operating portion 12 can move and rotate relative to each other. The specific shapes of the first operating portion 11 and the second operating portion 12 are not limited herein.

In some embodiments, the second operating portion 12 may be made of plastic, which is beneficial to the manufacture and the mass production of the second operating portion 12 due to high ductility and easy accessibility of plastic to reduce the cost of the operating assembly 10. It can be understood that the second operating portion 12 can be made of a material other than plastic. The specific material of the second operating portion 12 may be selected according to different situations. For example, in other embodiments, the second operating portion 12 may also be made of metal. The specific material of the second operating portion 12 is not limited herein.

In an embodiment of the present disclosure, the first operating portion 11 has a protruding portion 13 formed thereon, which can be arranged continuously or with intervals along a circumferential direction of the first operating portion 11, and the second operating portion 12 has a recess 14 defined thereon, the recess 14 may be arranged continuously or with intervals along a circumferential direction of the second operating portion 12.

In some embodiments, in an embodiment of the present disclosure, the first operating portion 11 includes an upper portion 113, a middle portion 114 and a lower portion 115. The middle portion 114 fixedly connects the upper portion 113 with the lower portion 115 by means of, for example, screws, snaping, interference fit, etc. A first notch 40 is defined on a lower peripheral edge of the upper portion 113, and the protruding portion 13 is disposed on a top surface of the first notch 40. An inner surface of the second operating portion 12 has a first portion 30 provided thereon, and the recess 14 is defined on an upper surface of the first portion 30. The position of the protruding portion 13 corresponds to the position of the recess 14. The protruding portion 13 is at least partially located in the recess 14, and can move relative to the recess 14. When the second operating portion 12 is located at the first position, the protruding portion 13 is partially located in the recess 14 to limit a lateral displacement of the second operating portion 12 to improve the rotational stability of the second operating portion 12. It can be understood that, in other embodiments, the protruding portion 13 may be disposed on the second operating portion 12, and the recess 14 may be defined on the first operating portion 11. The specific arrangements can be designed according to different situations, which is not limited herein. It can be understood that, in other embodiments, the first operating portion 11 may also be defined as an integrated structure.

Referring to FIG. 2 and FIG. 3, in some embodiments, the operating assembly 10 further includes a coupling structure 15. When the second operating portion 12 is located at the second position, the second operating portion 12 can drive, by means of the coupling structure 15, the first operating portion 11 to rotate.

In this way, by providing the coupling structure 15, the user can rotate the first operating portion 11 by rotating the second operating portion 12, and the structure is simple and easy to be implemented.

Referring to FIG. 2 and FIG. 3, in some embodiments, the coupling structure 15 includes a fixture block 151 and a fixture seat 152, the fixture block 151 is located in one of the first operating portion 11 and the second operating portion 12, and the fixture seat 152 is located in the other one of the first operating portion 11 and the second operating portion 12.

In this way, when the second operating portion 12 is located at the second position, the fixture block 151 is engaged with the fixture seat 152 to fix the first operating portion 11 and the second operating portion 12, the structure is simple and it is easy to be implemented.

In some embodiments, the fixture block 151 is located at the second operating portion 12, and the fixture seat 152 is located at the first operating portion 11. In one embodiment, an upper edge of the middle portion 114 has a second notch 50 defined thereon, the second notch 50 has a fixture seat 152 disposed on a bottom surface thereof, the second operating portion 12 has a second portion 212 disposed on an inner surface thereof, and the fixture block 151 is disposed on a lower surface of the second portion 212. The position of the fixture block 151 corresponds to the position of the fixture seat 152. When the second operating portion 12 needs to be located at the second position, the user can manually operate the second operating portion 12 to provide a downward force to the second operating portion 12, and thus the second operating portion 12 can be moved from the first position to the second position under the action of the force. When the second operating portion 12 moves to the second position, the fixture block 151 and the fixture seat 152 are in an engaged state, that is, the locking block 151 is snapped in the card seat 152. In this way, when the second operating portion 12 is located at the second position, the user can rotate the second operating portion 12 to drive the first operating portion 11 to rotate, i.e., allowing the rotation of the first operating portion 11, and the structure is simple and easy to be implemented.

In some embodiments, the operating assembly 10 includes a first elastic member 16. When the second operating portion 12 is located at the second position, the first elastic member 16 abuts between the first operating portion 11 and the second operating portion 12, and the first elastic member 16 is configured to provide the second operating portion 12 with a force to move from the second position to the first position.

In this way, when the coupling structure 15 is separated, the first elastic member 16 can automatically drive the second operating portion 12 to move from the second position to the first position, thus the structure is simple and easy to be implemented.

In this embodiment, the second operating portion 12 has a third portion 121 protruding from an inner surface thereof, and the first elastic member 16 is connected to a bottom surface of the second notch 50. When the second operating portion 12 is located at the first position, an upper end of the first elastic member 16 can abut against the third portion 121 or be separated from the third portion 241. When the second operating portion 12 is located at the second position, the upper end of the first elastic member 16 abuts against a lower surface of the third portion 121, and a lower end of the first elastic member 16 abuts against a bottom surface of the second notch 50 to provide the second operating portion 12 with an upward force. The first elastic member 16 may be a spring, a torsion spring, an elastic sheet or other elastic members. In the embodiment of the present disclosure, the first elastic member 16 is a spring. When the second operating portion 12 is located at the second position, the first elastic member 16 is in a compressed state. When the second operating portion 12 is located at the first position, the first elastic member 16 is in an elongated state compared to the compressed state.

It should be pointed out that, when the second operating portion 12 is located at the second position, a relative rotation between the second operating portion 12 and the first operating portion 11 is restricted by the coupling structure 15. In this case, the second operating portion 12 is freely movable in a direction from the second position towards the first position. That is to say, when the user manually operates the second operating portion 12 to provide a downward force to the second operating portion 12, the second operating portion 12 can be moved from the first position to the second position, and in this situation, the fixture seat 152 and the fixture block 151 are in the engaged state. At this time, if the user continuously provides the downward force to the second operating portion 12 and then rotates the second operating portion 12, the first operation can be rotated. In addition, the above-mentioned downward force provided by the user to the second operating portion 12 is greater than the above-mentioned upward force provided by the first elastic member 16 to the second operating portion 12, and the second operating portion 12 can move from the first position to the second position.

When the second operating portion 12 needs to return to the first position from the second position, the user only needs to withdraw the above-mentioned downward force provided to the second operating portion 12 to remove the above-mentioned downward force acting on the second operating portion 12. Since the above-mentioned upward force provided by the first elastic member 16 to the second operating portion 12 always exists, when the user withdraws the above-mentioned downward force provided to the second operating portion 12, the upward force provided by the first elastic member 16 to the second operating portion 12 can drive the second operating portion 12 to automatically move from the second position to the first position. Thus, without requiring the user's manual operation, the user can move the operating portion 12 from the second position to the first position merely by withdrawing the above-mentioned downward force provided to the second operating portion 12. In this way, the structure is simple and easy to be implemented, improving the user experience.

In such an embodiment, the coupling structure 15 only has a function of restricting a relative rotation between the second operating portion 12 and the first operating portion 11, but cannot restrict a movement of the second operating portion 12 in the direction from the second position towards the first position.

In other embodiments, when the second operating portion 12 is located at the second position, the relative rotation between the second operating portion 12 and the first operating portion 11 is restricted by the coupling structure 15, and the movement of the second operating portion 12 in the direction from the second position towards the first position is also restricted by the coupling structure 15. That is, in such an embodiment, when the second operating portion 12 is located at the second position, the coupling structure 15 is fixedly connected to the first operating portion 11 and the second operating portion 12. In this case, the second operating portion 12 cannot rotate or move relative to the first operating portion 11. In this way, on the one hand, it is convenient for the user to operate, and the second operating portion 12 is prevented from being moved from the second position to the first position by mistake under the force of the first elastic member 16. On the other hand, the user is not required to constantly apply a downward force on the second operating portion 12 to keep the second operating portion 12 in the second position to save effort.

For example, the user can manually operate the second operating portion 12 to provide an upward force to the second operating portion 12. Under the action of the force, the second operating portion 12 can move from the second position to the first position, and the fixture block 151 can be separated from the fixture seat 152, and the second operating portion 12 can be moved from the second position to the first position. In such an embodiment, the fixture seat 152 may has a fitting recess defined therein, and when the second operating portion 12 is located at the second position, the fixture block 151 is embedded in the fitting recess to realize the engaging between the fixture block 151 and the fixture seat 152.

In such an embodiment, the coupling structure 15 has both the function of restricting the relative rotation of the second operating portion 12 and the first operating portion 11, and the function of restricting the movement of the second operating portion 12 in the direction from the second position towards the first position. For example, the fixture block 151 and the fixture seat 152 are in a state of interference fit when they are engaged with each other.

In other embodiments, the coupling structure 15 may also be composed of other structural components. For example, in an example, the coupling structure 15 may include a first magnetic member and a second magnetic member, the first magnetic member is located at one of the first operating portion 11 and the second operating portion 12, and the second magnetic member is located at the other one of the first operating portion 11 and the second operating portion 12. The first magnetic member and the second magnetic member are configured to be magnetic when energized. In such an embodiment, when the second operating portion 12 is located at the second position, the first magnetic member and the second magnetic member may be energized to allow the first magnetic member and the second magnetic member to have opposite magnetism, and thus the first magnetic member and the second magnetic member can attract each other to form a stable connection between the first magnetic member and the second magnetic member. When the second operating portion 12 needs to be moved from the second position to the first position, the first magnetic member and the second magnetic member can be energized to allow the first magnetic member and the second magnetic member to have the same magnetism, and thus the first magnetic member and the second magnetic member can repel each other to separate the first magnetic member and the second magnetic member.

The description above is only to illustrate the working mode of the coupling structure 15 by means of examples. In different embodiments, the specific structure type of the coupling structure 15 can be determined according to different situations, which is not limited herein. It is only required that the coupling structure 15 can limit the relative rotation between the first operating portion 11 and the second operating portion 12, and/or can connect or separate the first operating portion 11 and the second operating portion 12. It is not limited herein.

Referring to FIG. 2 and FIG. 3, in some embodiments, the operating assembly includes a first contact member 17 mounted on the first operating portion 11, and a second contact member 18 mounted on the second operating portion 12.

When the second operating portion 12 is located at the first position, the first contact member 17 is connected to the second contact member 18. When the second operating portion 12 is located at the first position and is rotated, the first contact member 17 and the second contact member 18 rotate relative to each other to generate the first electric signal.

When the second operating portion 12 is located at the second position, the first contact member 17 is separated from the second contact member 18.

In this way, different electric signals can be generated when the second operating portion 12 is rotated.

In this embodiment, when the second operating portion 12 is located at the first position, the first contact member 17 and the second contact member 18 are in contact, and at this time, the second operating portion 12 can rotate relative to the first operating portion 11, allowing the first contact member 17 and the second contact member 18 to rotate relative to each other, to generate the first electric signal. When the second operating portion 12 is located at the second position, the first contact member 17 is separated from the second contact member 18, and when the second operating portion 12 is rotated, the rotation of the second operating portion 12 can generate different electric signals due to the separation of the first contact member 17 and the second contact member 18. When the second operating portion 12 is located at the second position, the second operating portion 12 can drive the first operating portion 11 to rotate. Therefore, the second operating portion 12, when being rotated, can drive the first operating portion 11 to rotate. In this way, different electric signals can be generated when the second operating portion 12 is rotated.

In this embodiment, the first contact member 17 is disposed on a lower surface of the upper portion 113, the second contact member 18 is disposed on an upper surface of the third portion 121, the position of the first contact member 17 corresponds to the position of the second contact member 18. Both the first contact member 17 and the second contact member 18 can be made of conductive material. The first contact member 17 includes two spaced contacts, i.e., a first contact and a second contact, the second contact member 18 corresponds to the two contacts. When the second operating portion 12 is located at the first position, the second operating portion 12 is rotated. In this case, the second operating portion 12 can rotate relative to the first operating portion 11. Since the second contact member 18 is in contact with the two contacts at this time, the second contact portion 18 is fixed on the second operating portion 12, and the two contacts are fixed on the first operating portion 11, the second contact member 18 and the two contacts can move relative to each other when the second operating portion 12 is rotated. Due to the relative movement between the second contact member 18 and the two contacts, the positions of the second contact member 18 and the two contacts also changes, and in this case, a resistance between the second contact member 18 and the two contacts also changes to convert the electric signals.

Referring to FIG. 2 and FIG. 3, in some embodiments, the operating assembly 10 includes a base 19. The first operating portion 11 is movably connected to the base 19. The base 19 has an output terminal 191 provided thereon and configured to output an electric signal of the operating assembly 10 to a controller of the household appliance 100.

In this way, it is convenient to connect the operating assembly 10 to the controller of the household appliance 100, allowing the operating assembly 10 to output different signals to the controller. The controller, in response to the received different signals, can control the household appliance 100 to performs different operations.

In an embodiment of the present disclosure, the output terminal 191 can be connected to the controller through a wire. The connection through the wire stabilizes the transmission of signal, which is beneficial to the transmission of signal. In other embodiments, the output terminal 191 can also be connected to a wireless transmission module, to wirelessly transmit signals to the controller. The wireless transmission module can be wirelessly connected by means of wireless connection such as Bluetooth connection and infrared connection, which can be specifically designed according to different situations and is not limited herein.

In some embodiments, in this embodiment, electric signals generated by the operations of the first operating portion 11 and the second operating portion 12 can be output by the output terminal 191. For example, the two contacts of the first contact member 17 may be connected to the output terminal 191 through the wires inside the first operating portion 11.

Figure 5:
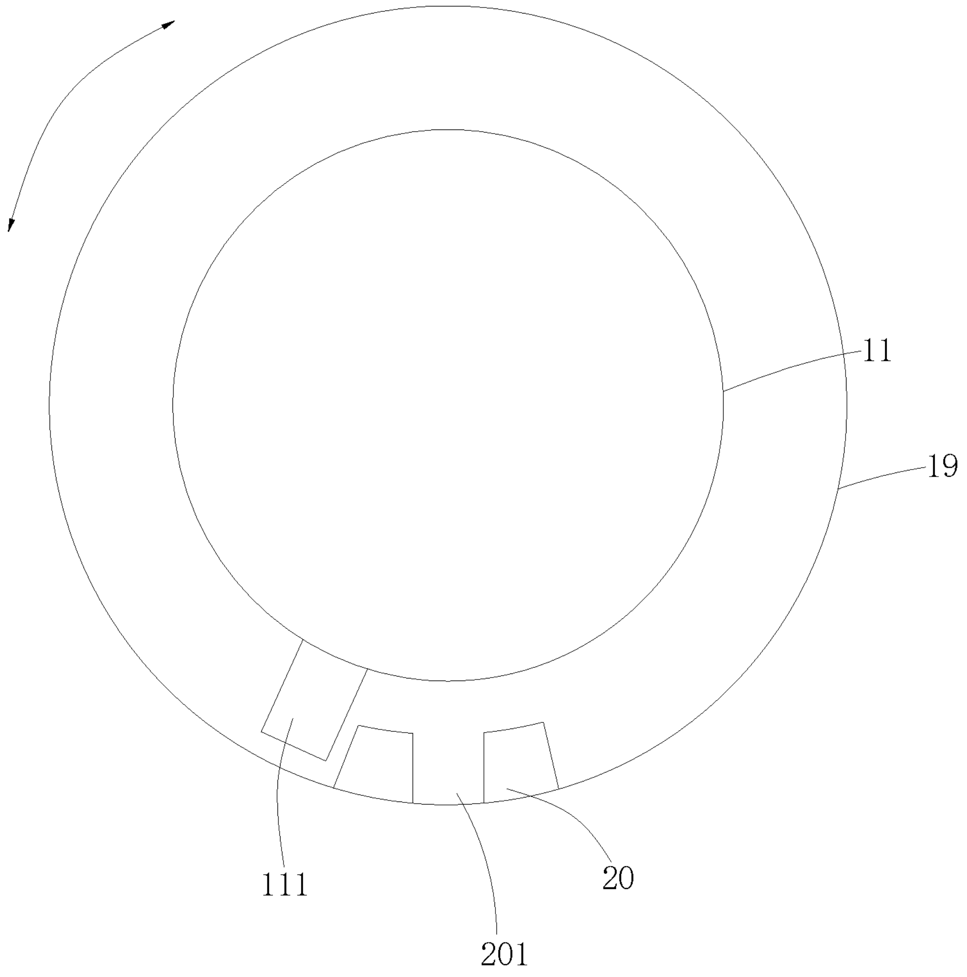
FIG. 5 is another schematic plan view of a limiting structure of an operating assembly according to an embodiment of the present disclosure.

Referring to FIG. 2 and FIG. 5, in some embodiments, the operating assembly 10 includes a limiting structure 20 disposed on the base 19, the first operating portion 11 can be located at a third position (FIG. 2) and a fourth position of the base 19 (FIG. 3), and the first operating portion 11 is switchable between the third position and the fourth position. When the first operating portion 11 is located at the third position, the limiting structure 20 is connected to the first operating portion 11 to limit a rotation of the first operating portion 11. When the first operating portion 11 is located at the fourth position, the limiting structure 20 is separated from the first operating portion 11 to remove the limitation on the rotation of the first operating portion 11, allowing the first operating portion 11 to rotate.

In this way, by providing the limiting structure 20, the first operating portion 11 located at different positions of the base 19 can be rotated or restricted to rotate to implement different functions.

Figure 4:
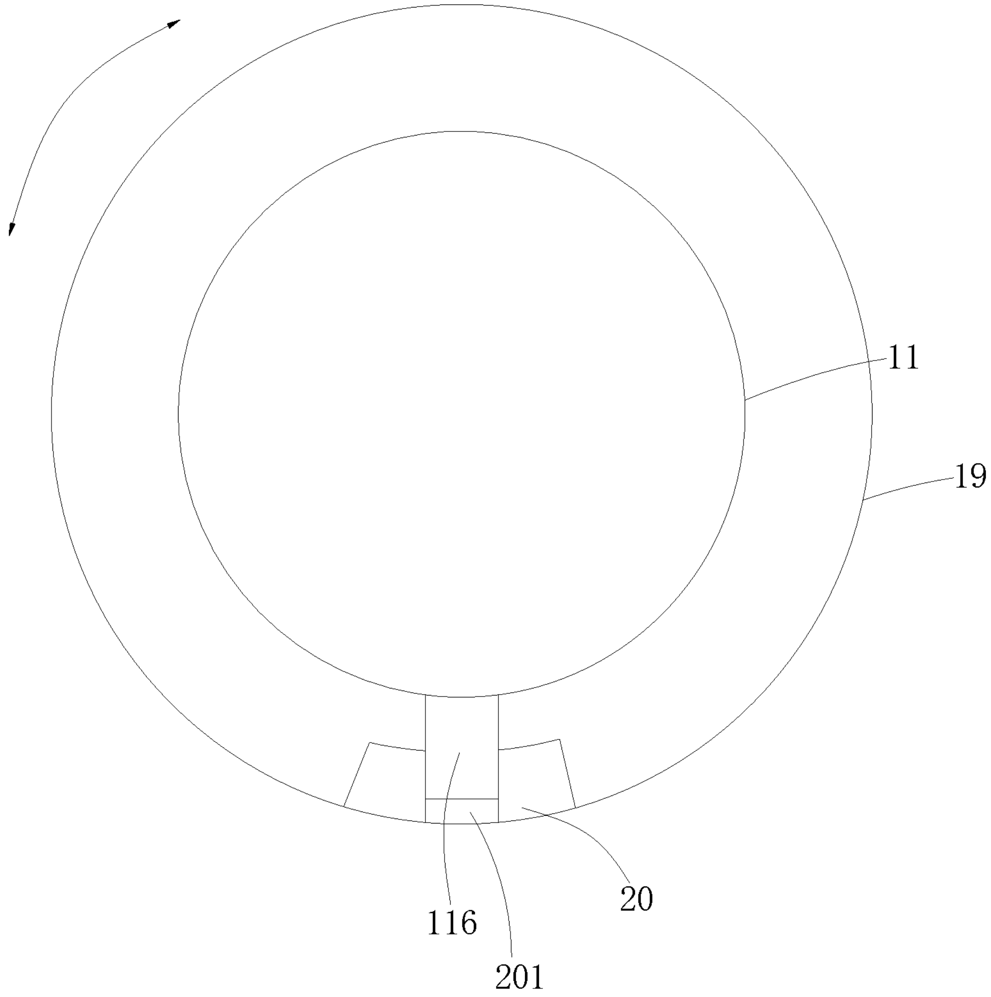
FIG. 4 is a schematic plan view of a limiting structure of an operating assembly according to an embodiment of the present disclosure.

In the present embodiment, the limiting structure 20 may have a limiting recess 201 defined in the middle thereof, the lower portion 115 of the first operating portion 11 has a fixture portion 116 defined on an outer peripheral surface thereof, the base 19 has a receiving space 192 defined therein, the lower portion 115 is partially located in the receiving space 192, and the limiting structure 20 is disposed on an inner surface of the receiving space 192. When the first operating portion 11 is located at the third position of the base 19 (see FIG. 2), the fixture portion 116 is located in the limiting recess 201 (see FIG. 4), and thus the first operating portion 11 is restricted from rotating. When the first operating portion 11 is located at the fourth position of the base 19 (see FIG. 3), the fixture portion 116 is separated from the limiting recess 201. Therefore, the rotation restriction of the first operating portion 11 is removed, and the first operating portion 11 can be rotated (see FIG. 5).

In other embodiments, the limiting structure 20 may be other structures. The specific type of the limiting structure 20 can be determined specifically according to different situations. It is only required that the limiting structure 20 can limit the rotation of the first operating portion 11. The specific type of the limiting structure 20 is not limited herein.

In the present embodiment, when the second operating portion 12 is located at the first position of the first operating portion 11, the first operating portion 11 is located at the third position of the base 19, and the second operating portion 12 can rotate relative to the first operating portion 11, and the first operating portion 11 is restricted from rotating. When the second operating portion 12 is located at the second position of the first operating portion 11, the first operating portion 11 is pressed (the first operating portion 11 can be pressed directly or by pressing the second operating portion 12) to move from the third position to the fourth position, and at this time, the rotation restriction of the first operating portion 11 is removed, and the first operating portion 11 can rotate.

Referring to FIG. 2 and FIG. 3, in some embodiments, the operating assembly 10 further includes a second elastic member 21 abutting against the base 19 and the first operating portion 11.

In this way, the first elastic member 16 can automatically drive the first operating portion 11 to move from a position of a pressed state to a position of an initial state (the position at which the first operating portion 11 is not pressed), and the structure is simple and easy to be implemented.

In this embodiment, a lower end of the second elastic member 21 abuts against a bottom surface of the receiving space 192, a lower peripheral edge of the lower portion has a third notch 60 defined therein, and the lower end of the second elastic member 21 abuts against a top surface of the notch 60. The second elastic member 21 is a spring, a torsion spring, an elastic sheet, or other elastic members. In the embodiment of the present disclosure, the second elastic member 21 is a spring. When the first operating portion 11 is located at the position of the pressed state, the second elastic member 21 is in a compressed state. When the first operating portion 11 is located at the position of the initial state, the second elastic member 21 is in an elongated state compared to the compressed state.

Referring to FIG. 2 and FIG. 3, in some embodiments, the operating assembly 10 further includes a switch member 22 configured to output the third electric signal when the first operating portion 11 is pressed.

In this way, the electric signal can be output by pressing the first operating portion 11, the structure is simple, and the cost is low.

In some embodiments, the switch member 22 includes a body 221, and an elastic contact member 222 disposed on the body 221. The elastic contact member 222 can move relative to the body 221 under the action of an external force, and the elastic contact member 222 can restore to an initial state when the external force is removed. In the example as illustrated in FIG. 2, the elastic contact 222 is in the initial state. In the example as illustrated in FIG. 3, when the first operating portion 11 is pressed, the elastic contact member 222 is pressed by the lower portion 115 of the first operating portion 11 to move relative to the body 221, and the electric signals are output. In this way, the electric signals can be output by pressing the first operating portion 11, the structure is simple, and the cost is low. In an example, a micro switch may be employed to serve as the switch member 22. In some embodiments, the body 221 can be connected to the output terminal 19 via a wire, to output a corresponding electric signal.

Referring to FIG. 2 and FIG. 3, in some embodiments, the operating assembly 10 further includes an encoder 23. The encoder 23 is connected to the first operating portion 11, and the encoder 23 is configured to detect a rotation angle of the first operating portion 11 and output the second electric signal based on the rotation angle.

In this way, the encoder 23 can output different second electric signals based on different rotation angles of the first operating portion 11 to conveniently and quickly control the household appliance 100 to implement different functions, improving the user experience.

In some embodiments, the encoder 23 is mounted on a bottom surface of the lower portion 115. With different rotation angle of the first operating portion 11, the second electric signal of the output is also different, and thus the household appliance 100 can implement different functions based on different second electric signals.

Referring to FIG. 1, the embodiments of the present disclosure provide a household appliance 100, which includes the operating assembly 10 according any one of the above embodiments, and a panel 101. The operating assembly 10 is mounted on the panel 101.

In the household appliance 100 of the embodiments of the present disclosure, when different operations are performed on the first operating portion 11 and the second operating portion 12, the operating assembly 10 can output different electric signals, the functions of the knobs can be multiplied by providing the two operating portions to satisfy the multi-functionalization of the household appliance 100, and the structure is simple and easy to be implemented to improve the user convenience.

Further, in the embodiment of the present disclosure, the base 19 is located at a lower side of the panel 101, the panel 101 has an opening 102 defined thereon, and the first operating portion 11 passes through the opening 102 and is connected to the base 19. The base 19 may be fixed inside a housing of the household appliance 100.

In the illustrated embodiment, the panel 101 has two operating assemblies 10. In other embodiments, the number of the operating assembly 10 may be one, three, or more than three. The specific number of operation components 10 may be determined according to actual needs, and is not specifically limited herein.

In the specification, reference to the terms "one embodiment", "some embodiments", "exemplary embodiments", "example", "specific examples", or "some examples", etc. indicate that a particular feature, structure, material, or characteristic described in connection with the described embodiment(s) or example(s) is included in at least one embodiment or example of the present disclosure. In this specification, schematic representations of the above terms do not necessarily refer to the same embodiment or example. Furthermore, the particular features, structures, materials or characteristics described may be combined in any suitable manner in any one or more embodiments or examples.

What is claimed is:

1. An operating assembly for a household appliance, the operating assembly comprising:

a first operating portion; and a second operating portion, wherein the first operating portion is at least partially disposed in the second operating portion, and wherein the second operating portion is located at a first position and a second position of the first operating portion, and is configured to move back and forth between the first position and the second position, the operating assembly being configured in such a manner that:

in accordance with a determination that the second operating portion is located at the first position, the second operating portion is rotatable relative to the first operating portion to generate a first electric signal;

in accordance with a determination that the second operating portion is located at the second position, the second operating portion drives the first operating portion to rotate, a second electric signal generated during a rotation of the first operating portion; and the first operating portion is configured to be pressed to generate a third electric signal.

2. The operating assembly according to claim 1, further comprising a coupling structure, wherein in accordance with the determination that the second operating portion is located at the second position, the second operating portion is configured to driving, by means of the coupling structure, the first operating portion to rotate.

3. The operating assembly according to claim 2, wherein the coupling structure comprises:

a fixture block located at one of the first operating portion and the second operating portion; and a fixture seat located at an other one of the first operating portion and the second operating portion.

4. The operating assembly according to claim 1, further comprising a first elastic member, wherein in accordance with the determination that the second operating portion is located at the second position, the first elastic member abuts between the first operating portion and the second operating portion, and is configured to provide the second operating portion with a force to move from the second position to the first position.

5. The operating assembly according to claim 1, further comprising a first contact member mounted on the first operating portion, and a second contact member mounted on the second operating portion, wherein in accordance with the determination that the second operating portion is located at the first position, the first contact member is connected to the second contact member;

in accordance with the determination that the second operating portion is located at the first position and is rotated, the first contact member and the second contact member rotate relative to each other to generate the first electric signal; and in accordance with the determination that the second operating portion is located at the second position, the first contact member is separated from the second contact member.

6. The operating assembly according to claim 1, further comprising a base, wherein the first operating portion is movably connected to the base which has an output terminal provided thereon and configured to output an electric signal of the operating assembly to a controller of the household appliance.

7. The operating assembly according to claim 6, further comprising a limiting structure disposed on the base, wherein the first operating portion is located at a third position and a fourth position of the base, and is switchable between the third position and the fourth position;

in accordance with a determination that the first operating portion is located at the third position, the limiting structure is connected to the first operating portion to limit a rotation of the first operating portion; and in accordance with a determination that the first operating portion is located at the fourth position, the limiting structure is separated from the first operating portion to remove the limitation on the rotation of the first operating portion, allowing the first operating portion to rotate.

8. The operating assembly according to claim 6, further comprising a second elastic member abutting against the base and the first operating portion.

9. The operating assembly according to claim 1, further comprising a switch member configured to output the third electric signal in response to the first operating portion being pressed.

10. The operating assembly according to claim 1, further comprising an encoder connected to the first operating portion, wherein the encoder is configured to detect a rotation angle of the first operating portion and output the second electric signal based on the rotation angle.

11. A household appliance, comprising:

a panel; and an operating assembly mounted on the panel, wherein the operating assembly comprises:

a first operating portion; and a second operating portion, wherein the first operating portion is at least partially disposed in the second operating portion, and wherein the second operating portion is located at a first position and a second position of the first operating portion, and configured to move back and forth between the first position and the second position, the operating assembly being configured in such a manner that:

in accordance with a determination that the second operating portion is located at the first position, the second operating portion is rotatable relative to the first operating portion to generate a first electric signal;

in accordance with a determination that the second operating portion is located at the second position, the second operating portion is configured to drive the first operating portion to rotate, a second electric signal generated during a rotation of the first operating portion; and the first operating portion is pressed to generate a third electric signal.

12. The household appliance according to claim 11, wherein the operating assembly further comprises a coupling structure, wherein in accordance with the determination that the second operating portion is located at the second position, the second operating portion is configured to drive, by means of the coupling structure, the first operating portion to rotate.

13. The household appliance according to claim 12, wherein the coupling structure comprises:

a fixture block located at one of the first operating portion and the second operating portion; and a fixture seat located at an other one of the first operating portion and the second operating portion.

14. The household appliance according to claim 11, wherein the operating assembly further comprises a first elastic member, wherein in accordance with the determination that the second operating portion is located at the second position, the first elastic member abuts between the first operating portion and the second operating portion, and is configured to provide the second operating portion with a force to move from the second position to the first position.

15. The household appliance according to claim 11, wherein the operating assembly further comprises a first contact member mounted on the first operating portion, and a second contact member mounted on the second operating portion, wherein in accordance with the determination that the second operating portion is located at the first position, the first contact member is connected to the second contact member;

in accordance with the determination that the second operating portion is located at the first position and is rotated, the first contact member and the second contact member rotate relative to each other to generate the first electric signal; and in accordance with the determination that the second operating portion is located at the second position, the first contact member is separated from the second contact member.

16. The household appliance according to claim 11, wherein the operating assembly further comprises a base, wherein the first operating portion is movably connected to the base which has an output terminal provided thereon and configured to output an electric signal of the operating assembly to a controller of the household appliance.

17. The household appliance according to claim 16, wherein the operating assembly further comprises a limiting structure disposed on the base, wherein the first operating portion is located at a third position and a fourth position of the base, and is switchable between the third position and the fourth position;

in accordance with a determination that the first operating portion is located at the third position, the limiting structure is connected to the first operating portion to limit a rotation of the first operating portion; and in accordance with a determination that the first operating portion is located at the fourth position, the limiting structure is separated from the first operating portion to remove the limitation on the rotation of the first operating portion, allowing the first operating portion to rotate.

18. The household appliance according to claim 16, wherein the operating assembly further comprises a second elastic member abutting against the base and the first operating portion.

19. The household appliance according to claim 11, wherein the operating assembly further comprises a switch member configured to output the third electric signal in response to the first operating portion being pressed.

20. The household appliance according to claim 11, wherein the operating assembly further comprises an encoder connected to the first operating portion, wherein the encoder is configured to detect a rotation angle of the first operating portion and output the second electric signal based on the rotation angle.

* * * * *